United States Patent
Avila Dias

(10) Patent No.: US 11,149,868 B2
(45) Date of Patent: Oct. 19, 2021

(54) THERMODYNAMIC VALVE FOR RETAINING VAPOURS AND GASES AND RELIEVING PRESSURE AND VACUUM

(71) Applicant: Miguel Greyde Avila Dias, Porto Alegre (BR)

(72) Inventor: Miguel Greyde Avila Dias, Porto Alegre (BR)

(*) Notice: Subject to any disclaimer, the term of this patent is extended or adjusted under 35 U.S.C. 154(b) by 0 days.

(21) Appl. No.: 17/273,199

(22) PCT Filed: Jul. 25, 2019

(86) PCT No.: PCT/BR2019/050293
§ 371 (c)(1),
(2) Date: Jun. 10, 2021

(87) PCT Pub. No.: WO2020/047629
PCT Pub. Date: Mar. 12, 2020

(65) Prior Publication Data
US 2021/0293341 A1    Sep. 23, 2021

(30) Foreign Application Priority Data
Sep. 3, 2018  (BR) .......................... 1020180676300

(51) Int. Cl.
*F16K 17/19*    (2006.01)
*F16K 15/08*    (2006.01)

(52) U.S. Cl.
CPC .............. *F16K 17/19* (2013.01); *F16K 15/08* (2013.01); *Y10T 137/7838* (2015.04); *Y10T 137/8811* (2015.04)

(58) Field of Classification Search
CPC ......... Y10T 137/7838; Y10T 137/8811; F16K 17/19; F16K 15/08
See application file for complete search history.

(56) References Cited

U.S. PATENT DOCUMENTS 2,757,819 A * 8/1956 Badger, Jr. ......... B60K 15/0409
220/295
3,612,507 A * 10/1971 Stokes ................ F04B 39/1033
269/47

(Continued)

FOREIGN PATENT DOCUMENTS

BR         9801251 A    4/2000
BR       PI0519066 B1   7/2018
(Continued)

*Primary Examiner* — Michael R Reid
*Assistant Examiner* — Frederick D Soski
(74) *Attorney, Agent, or Firm* — Hoglund & Pamias, PSC; Roberto J. Rios

(57) ABSTRACT

A thermodynamic valve for retaining vapours and gases and relieving pressure and vacuum for use in the venting of tanks or reservoirs of combustible liquids (fluids), said valve comprising: upper diaphragm ring (3a) and lower diaphragm ring (3b) that act through the thermodynamic action of the positive and negative pressures inside positive pressure (4) and negative pressure (5) chambers fixed to one another, a cap (2) screwed on the body of positive pressure chamber (4) and having upwardly directed lateral openings and a rupture seal (1) fitted in the upper section of cap (2). A base (5.1) with an inner fire-break fabric (6) is positioned on the inner lower section of negative pressure chamber (5) and connected to the fuel tank venting pipe.

3 Claims, 2 Drawing Sheets

(56) References Cited

U.S. PATENT DOCUMENTS

| | | | |
|---|---|---|---|
| 3,656,500 A * | 4/1972 | Mayer, Sr. | F16K 15/08 137/271 |
| 4,217,930 A * | 8/1980 | Lerner | B63J 2/08 137/517 |
| 4,307,751 A * | 12/1981 | Mayer | F16K 15/08 137/454.4 |
| 4,628,958 A * | 12/1986 | Miller | F16K 15/08 137/512.15 |
| 5,327,944 A * | 7/1994 | Healy | B67D 7/421 137/459 |
| 5,499,654 A * | 3/1996 | Shefte | F16K 17/19 137/493.9 |
| 5,809,976 A | 9/1998 | Cook et al. | |
| 5,954,091 A | 9/1999 | Leadford | |
| 6,539,974 B2 * | 4/2003 | Steinruck | F04B 39/1033 137/512.1 |
| 6,866,056 B1 | 3/2005 | Scott | |
| 7,263,981 B2 | 9/2007 | Woody | |
| 7,591,251 B1 | 9/2009 | Roche et al. | |
| 2008/0156381 A1 * | 7/2008 | Tuymer | F04B 39/1053 137/512.1 |
| 2011/0083771 A1 * | 4/2011 | Whelan | F02M 37/0076 141/126 |
| 2014/0326742 A1 * | 11/2014 | Dunkle | B60K 15/03504 220/746 |
| 2015/0369385 A1 | 12/2015 | Girard et al. | |
| 2017/0174071 A1 * | 6/2017 | Mckinster | B60K 15/035 |
| 2017/0227136 A1 * | 8/2017 | Workman | F16K 24/044 |
| 2019/0017614 A1 * | 1/2019 | Li | F16K 15/147 |

FOREIGN PATENT DOCUMENTS

| | | |
|---|---|---|
| EP | 1888954 B1 | 2/2008 |
| GB | 2546364 A2 | 7/2017 |
| JP | 2017218942 A | 12/2017 |

* cited by examiner

THERMODYNAMIC VALVE FOR RETAINING VAPOURS AND GASES AND RELIEVING PRESSURE AND VACUUM

FIELD OF THE INVENTION

This specification relates to the development of a thermodynamic valve for retaining vapours and gases and relieving pressure and vacuum to be used in the venting (breathing) of tanks or reservoirs of combustible liquids (fluids), at storage points, in industry or at any other facility for storage or sale of liquid fuels containing volatile compounds.

BACKGROUND INFORMATION

Underground, aerial or not fuel tanks or reservoirs are subjected to temperature and pressure changes caused by the filling and emptying processes of same. To avoid explosion hazards during the filling and emptying processes it is mandatory to control said pressure and temperature changes.

An equipment used to this end is the thermodynamic valve for retaining vapours and gases for relieving pressure and vacuum since, besides providing pressure relief in a positive way, it is still able to prevent vacuum. This kind of valve is installed in liquid combustibles storage tanks, its main function being to create pressure and vacuum relief, provide safety and protection to the storage tanks by retaining the losses by evaporation.

The risk of the occurrence of a tank or reservoir breakage by overloading or the excess of negative pressure causing its collapse (kneading) is significantly reduced by installing a thermodynamic valve for relieving pressure and vacuum since the air flowrate in both directions is released, with independent pressures at each direction.

Also, this kind of valve aims at retaining the exit of volatile vapours and gases through the tank vents towards the atmosphere, avoiding pollution, losses, formation of explosive mixtures in the vents vicinity and/or preventing occupational and occasional diseases to any one in the vicinity of the tank vents.

One illustrative example of the state-of-the-art technique is Brazilian Utility Model MU 8301655-4 which describes a magnetic valve for the recovery of vapours and gases used for venting liquid combustible tanks or reservoirs where the sealing of the valve is achieved by the modulation of two magnetic discs, favouring the condensation of vapours and gases on the inner walls of the systems where the same are installed, the coalescing of the formed droplets leading to the return of the combustible mass stored in the tank.

As drawbacks exhibited by the state-of-the-art documents, the most well-known relief and pressure valves make use of springs, as can be seen in US patent document U.S. Pat. No. 4,498,493. Other valves employ a magnetic system as is the case of Brazilian patent document BR9801251-7.

SUMMARY OF THE INVENTION

Aiming at providing a valve that dispenses with springs for performing the pressure and vacuum control, while not depending on magnetism for working, the present thermodynamic valve was developed for retaining vapours and gases and relieving pressure and vacuum, being generally cylindrically-shaped or of any other suitable shape.

Broadly, the valve of the invention comprises an upper diaphragm ring (3a) and a lower diaphragm ring (3b) automatically modulated by the thermodynamic action of the pressures in the interior of a positive pressure chamber (4) and a negative pressure chamber (5).

A cap (2) with lateral openings directed upwards is threaded on the body of positive chamber (4).

A rupture seal (1) fitted on the upper section of cap (2) provides extra safety.

At the inner lower section of negative pressure chamber (5), a base (5.1) is fixed to the fuel tank vent, and within base (5.1) a fire-break fabric (6) is fixed by means of O-ring (7).

A fire-break fabric (4.1) is positioned between the positive pressure chamber (4) and the negative pressure chamber (5) of the valve.

BRIEF DESCRIPTION OF THE DRAWINGS

The characterization of the present invention is obtained by exemplary Figures of the thermodynamic valve for retaining vapours and gases and pressure and vacuum relief to enable the product to be fully reproduced by the most suitable technique, allowing the full functionality of the claimed object.

These Figures are merely illustrative, and variations are admitted provided they do not deviate from the initially claimed. In this case.

DETAILED DESCRIPTION OF THE INVENTION

Figure 1:
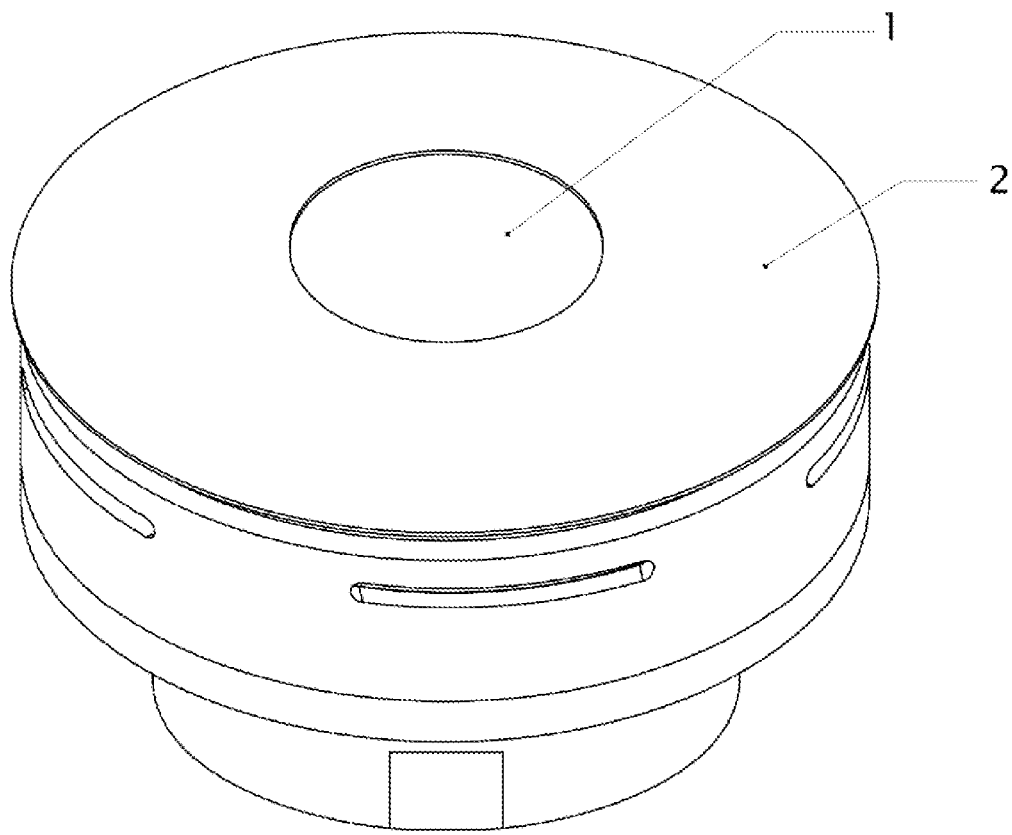
FIG. 1 is a perspective view of the proposed valve.
Figure 2:
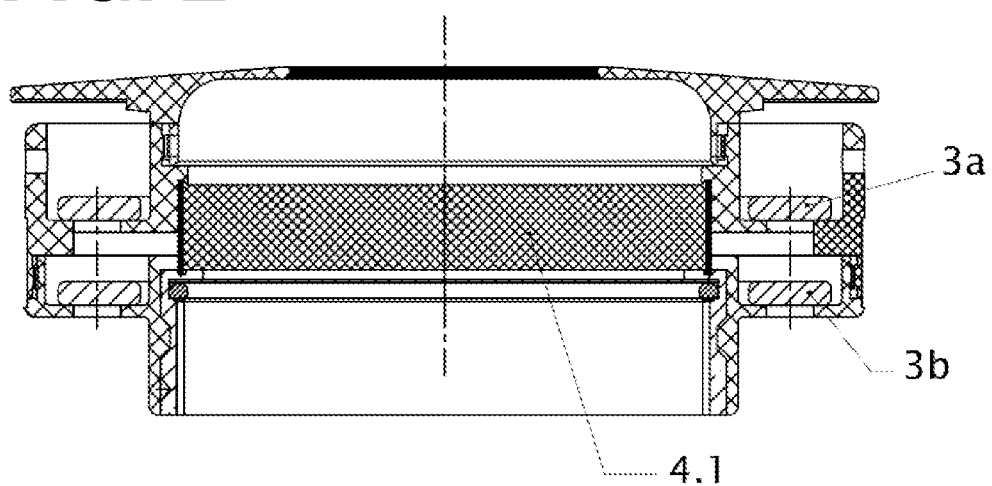
FIG. 2 is a cross-section cut of the valve.
Figure 3:
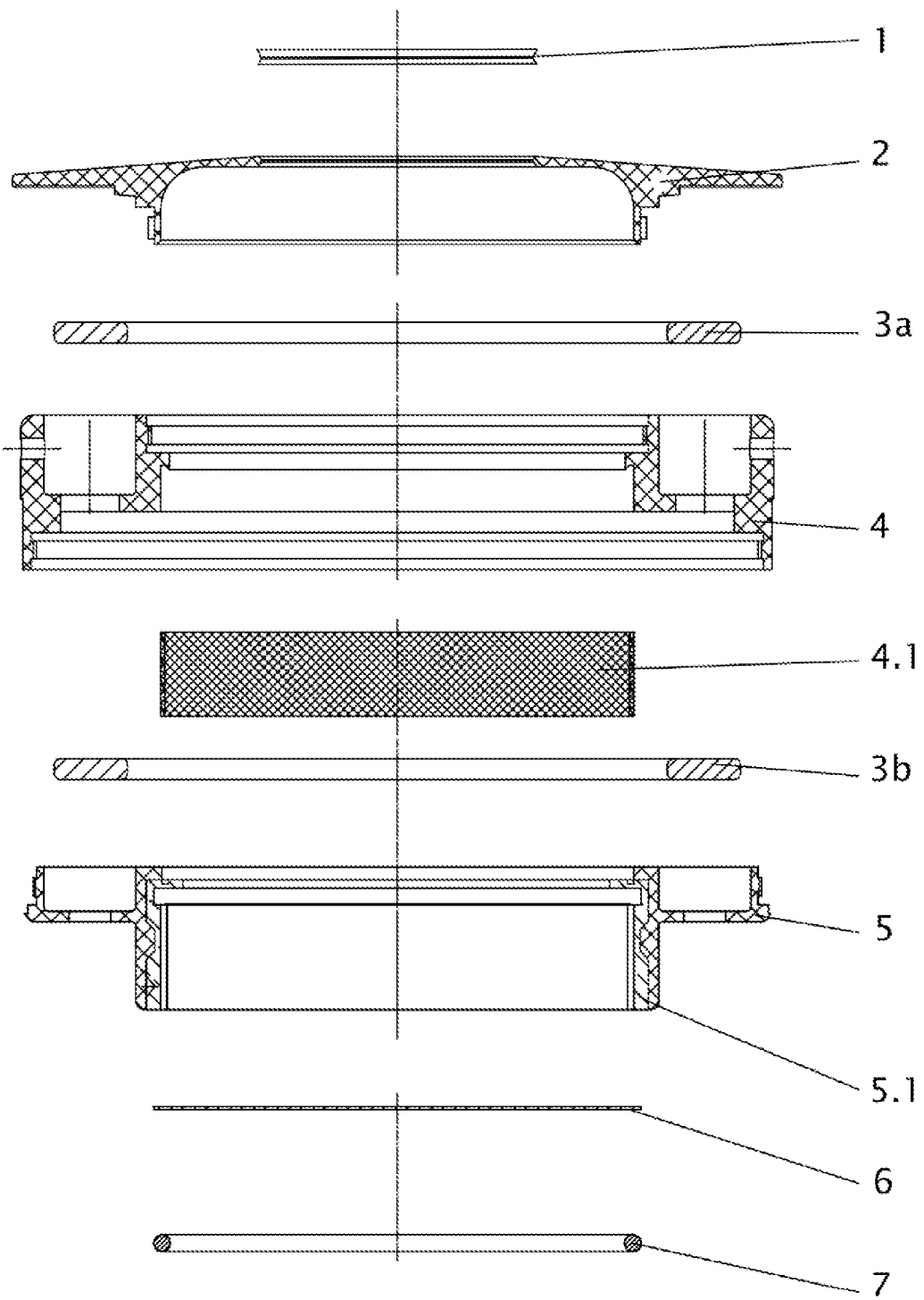
FIG. 3 is an exploded view of the valve.

On the basis of the illustrated Figures which express the best form or preferred mode of performing the designed product the description of the specification follows a detailed and consecutive numbering, where the aspects which would be implied by the adopted representation are exposed to clearly determine the intended protection.

The present valve is compact, its working principle makes use of the automatic modulation of two diaphragm rings (3a,3b) by the thermodynamic action of the positive and negative pressures in the interior of chambers (4), of positive pressure, and (5), of negative pressure, fixed together by threads.

A cap (2) with upward lateral openings (not represented) is threaded to the chamber (4) body.

The valve is provided with extra safety by means of a non-metallic rupture seal (1) fitted to the upper section of cap (2) and designed to prevent excessive pressure.

The modulated sealing provided by the valve favours the condensation of vapours and gases on the inner fuel tank (not represented) walls, the coalescing of formed droplets resulting in the return to the mass of fluid stored in the tank.

Positive pressure occurs when fuel enters the fuel tank by loading, that is, when the tank receives fuel.

Relief in positive pressure occurs by the effect of generating increase in air and/or gases within the fuel tank, leading to the upward movement of upper diaphragm ring (3a) inside positive pressure chamber (4) to alleviate the positive pressure generated within the fuel tank. Consequently, lower diaphragm ring (3b) within negative pressure chamber (5) will prevent air or gases at positive pressure from exiting the lower apertures (not represented) of negative pressure chamber (5).

Negative pressure (vacuum) occurs when fuel exits the fuel tank by drainage, that is, when the fuel is being moved from the fuel tank to the supply at the service station.

Relief in negative pressure occurs by generating vacuum inside the fuel tank, lower diaphragm ring (3b) being moved upwards within negative pressure chamber (5) aiming at enabling air to enter the fuel tank and preventing collapse. Consequently, upper diaphragm ring (3a) positioned at the positive pressure chamber (4) will be kept shut, allowing equalization of pressures within the fuel tank.

A base (5.1) positioned on the inner lower section of negative pressure chamber (5) is provided with threads for fixation to the fuel tank venting pipe (breathing), the interior of same having a stainless-steel fire-break fabric (6) attached by an O-ring (7) aiming both at preventing combustion access to the interior of the system and retain solid particles.

In order to retain solid particles, the valve of the invention is provided with a further safety element by means of a stainless-steel fire-break fabric (4.1), the same being positioned between the positive pressure chamber (4) and the negative pressure chamber (5).

Features of said thermodynamic valve of pressure and vacuum relief:

- extreme sealing, securing minimum product losses and reduced environmental impact; and
- Adjustment pressure very close to opening pressure, enabling optimum system pressure maintenance.

I claim:

1. A thermodynamic valve for retaining vapours and gases and relieving pressure and vacuum, characterized in that it comprises:

- an upper diaphragm ring (3a) and a lower diaphragm ring (3b) automatically modulated by a thermodynamic action of pressures in an interior of a positive pressure chamber (4) and a negative pressure chamber (5);
- a cap (2) with lateral openings directed upwards, said cap (2) being threaded on a body of said positive pressure chamber (4);
- a rupture seal (1) fitted on an upper part of said cap (2);
- a base (5.1) in a lower inner section of said negative pressure chamber (5), said base (5.1) being fixed to a vent pipe of a fuel tank, wherein an interior of said base (5.1) is provided with a first fire-break fabric (6) fixed by an O-ring (7); and
- e) a second fire-break fabric (4.1) positioned between said positive pressure chamber (4) and said negative pressure chamber (5).

2. The thermodynamic valve of claim 1, wherein relief in positive pressure occurs by increasing at least one of:

air or gases within the fuel tank, leading to an upward movement of said upper diaphragm ring (3a) inside the positive pressure chamber (4) to alleviate a positive pressure generated within the fuel tank while the lower diaphragm ring (3b) within said negative pressure chamber (5) prevents air or gases at positive pressure from exiting lower apertures of said negative pressure chamber (5).

3. The thermodynamic valve of claim 1, wherein relief in negative pressure occurs by generating vacuum inside the fuel tank, said lower diaphragm ring (3b) being moved upwards within the negative pressure chamber (5) enabling air to enter the fuel tank and preventing collapse, while said upper diaphragm ring (3a) positioned at the positive pressure chamber (4) is kept shut, allowing equalization of pressures within the fuel tank.

* * * * *